United States Patent [19]
Sol et al.

[11] Patent Number: 5,914,178
[45] Date of Patent: Jun. 22, 1999

[54] LAMINATED PANE COMPRISING A VISIBLE MOTIF

[75] Inventors: Jean-Marc Sol, Montpellier; Nicole Boursier, Sully-sur-Loire, both of France

[73] Assignee: Saint-Gobain Vitrage International, Courbevoie, France

[21] Appl. No.: 08/942,491

[22] Filed: Oct. 2, 1997

Related U.S. Application Data

[63] Continuation of application No. 08/374,524, filed as application No. PCT/FR94/00722, Jun. 16, 1994, abandoned.

[30] Foreign Application Priority Data

Jun. 18, 1993 [FR] France .................................. 93 07376

[51] Int. Cl.$^6$ ...................................................... B32B 3/00
[52] U.S. Cl. ........................ 428/195; 428/423.1; 428/426; 52/786.12; 296/84.1; 296/96.19; 351/44; 156/100

[58] Field of Search .................................. 428/195, 423.1, 428/425.6, 426; 296/84.1, 96.19, 215; 52/786.1, 786.11, 786.12; 351/44; 156/100

[56] References Cited

U.S. PATENT DOCUMENTS

| 2,636,420 | 4/1953 | Ryan et al. ................................ 88/108 |
| 4,976,805 | 12/1990 | Ishii et al. ................................ 156/100 |
| 5,040,838 | 8/1991 | Yoshizawa .............................. 296/84.1 |
| 5,284,376 | 2/1994 | Zweigart ............................... 296/96.19 |
| 5,324,568 | 6/1994 | Coninx et al. ........................... 428/195 |

*Primary Examiner*—Elizabeth Evans
*Attorney, Agent, or Firm*—Oblon, Spivak, McClelland, Maier & Neustadt, P.C.

[57] ABSTRACT

This invention relates to a laminated pane, having a visible motif, the pane including at least one rigid sheer of glass or plastics material and at least one sheet of flexible plastics material. The motif is formed of at least one organic ink layer organic ink situated on an internal face of one of the sheets forming the laminated pane, the sheets being assembled under the conjugate action of pressure and heat.

16 Claims, 2 Drawing Sheets

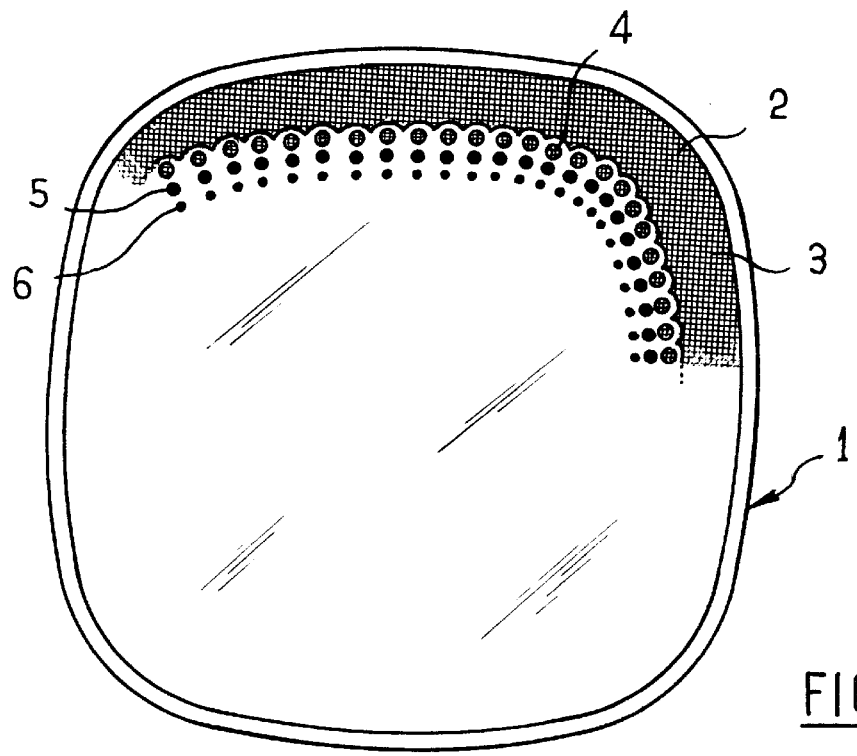
FIG_1
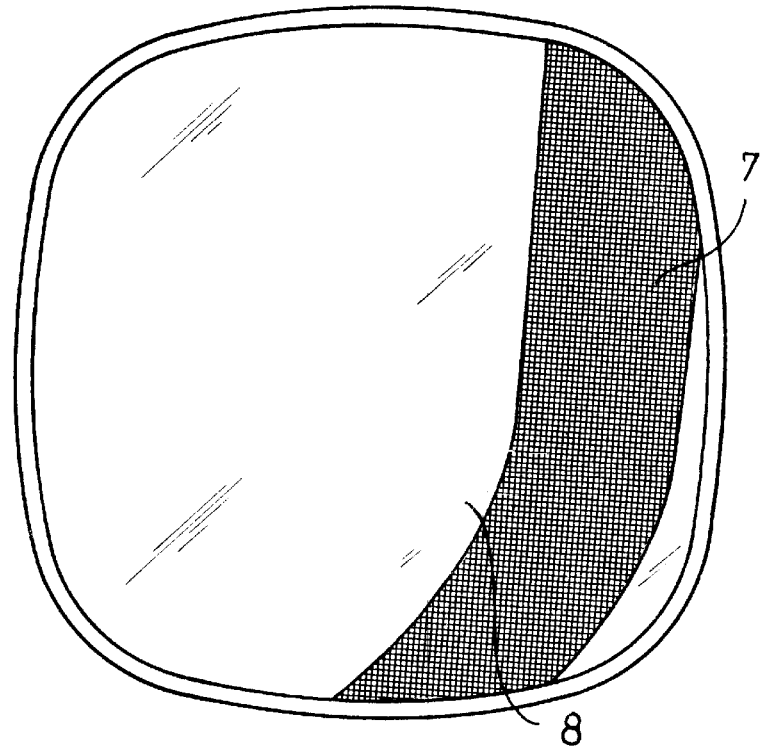
FIG_2

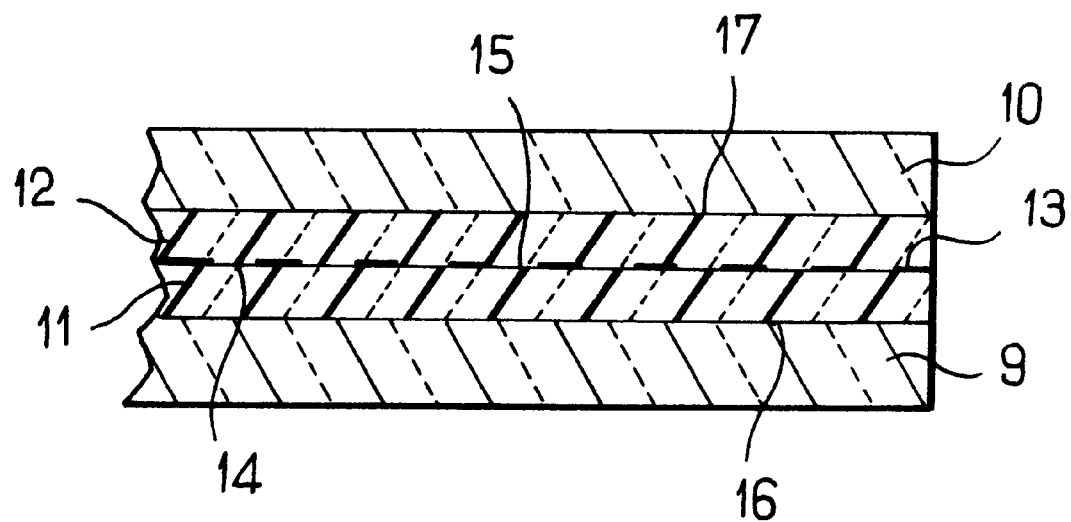
FIG_3
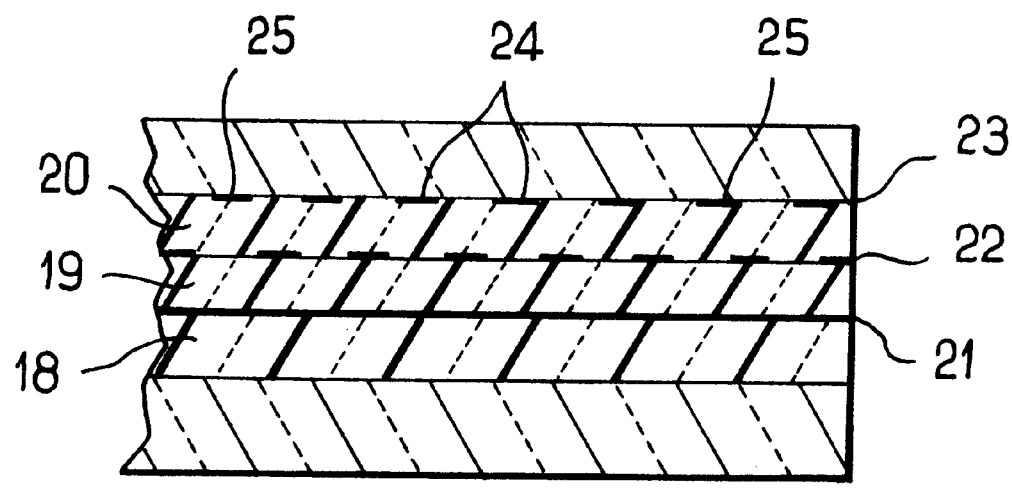
FIG_4

ABSTRACT# LAMINATED PANE COMPRISING A VISIBLE MOTIF

This application is a Continuation of application Ser. No. 08/374,524, filed on Jul. 13, 1995, now abandoned, which is a 371 application of PCT/FR94/00722, filed Jun. 16, 1994.

TECHNICAL FIELD

This invention relates to a laminated pane comprising, on at least a portion of its area, a visible motif. The invention relates also to the method of producing this pane.

BACKGROUND ART

The term laminated pane is to be understood, according to this invention, as implying a pane composed of at least one rigid sheet and of one flexible sheet of plastics material. These laminated panes may be panes known as symmetrical, when they comprise two rigid sheets as outer sheets. These laminated panes may also be known as asymmetrical, when they comprise a rigid sheet and a flexible sheet as outer sheets.

These sheets of flexible plastics material forming part of the composition of a laminate d pane are intended to improve the properties of a pane. For example, it may be a plastics material of the polyurethane type, used as outer sheet in order to give the pane, notably, properties of resistance to scratching. They may also be intermediate sheets of polyurethane or polyvinyl butyral or any other material. An intermediate sheet of polyvinyl butyral improves, in particular, the impact resistance of the pane.

Rigid sheets may also undergo treatments for the purpose of improving their characteristics. It is known, for example, to subject glass sheets to a chemical or thermal toughening for increasing their mechanical strength.

These laminated panes may comprise a decorative and/or functional motif.

This may be a motif for decorating the pane and/or enabling it to harmonize with its environment. The motif may also serve for protecting, notably from light, the adhesive films used for mounting the pane or for the fitting of accessories, or again for masking the electrical supply strips for heating networks.

Whatever its function, this motif is visible.

For this reason, the motif should be free of any deterioration, throughout its entire existence, which may extend to ten years or more. The term deterioration is to be understood, according to this invention, as including any scratching, any flaking, scaling or chipping, any overflowing or again any alteration in the colors of the motif, its shape etc. The flow or creep of the material constituting the motif leads, for example, to overflowing or inaccuracies of shape.

For all these reasons, such a motif is generally composed of an enamel, the excellent heat resistance and mechanical strength of which is well known. Moreover, enamel has the advantage of possessing a high adhesive power with respect to glass: its composition includes fritts of glass capable of being vitrified at high temperature and thus intimately bonding the enamel to the glass support.

To produce the enamelled layer, the preferred procedure is to deposit the enamel on the substrate, and then to dry the humid film formed until this film has sufficient adhesion and strength to avoid the appearance of marks on the formed film during the handling of the pane.

Different films can, of course, be deposited in this way. Finally, the enamelled film or films are subjected to a thermal treatment at high temperature in order to vitrify the enamel and to obtain the definitive coating.

For reasons of expenditure of energy, this thermal treatment at high temperature is generally associated with the thermal treatments used for transforming the glass sheet, for example for the bending or the thermal toughening of the glass sheet.

This method gives entire satisfaction when it is intended to be applied to a bent and/or thermally toughened pane, which may perhaps be laminated.

However, it requires a supplementary and expensive thermal treatment when the pane is not of curved shape nor is thermally toughened.

Furthermore, the enamelling process is incompatible with a chemical toughening treatment. The enamelled coating forms a kind of barrier resisting the ion exchanges for the purpose of chemically reinforcing the surface of the glass supporting the enamel film. On the other hand, the enamelling process if carried out after the chemical toughening treatment harms the toughening of the glass.

DISCLOSURE OF THE INVENTION

The present invention overcomes these disadvantages.

This invention proposes, in particular, a laminated pane comprising a visible motif, regardless of the type of pane.

The invention proposes, in particular, a curved, chemically reinforced laminated pane, comprising a visible motif, produced in satisfactory industrial conditions.

The invention proposes also a method of producing a motif on laminated panes, a method that shall avoid the need for high temperature thermal treatment.

The invention concerns a laminated pane comprising a visible motif, said pane being constituted of at least one rigid sheet of glass or of plastics material and of a sheet of flexible plastics material, the motif being formed of at least one layer based upon an ink of the epoxy type situated on an internal surface, of one of the sheets constituting the pane.

Preferably, at least one internal face of a sheet of flexible plastics material is coated with at least one layer of ink of epoxy type, at least partly forming the motif.

The visible motif according to this invention is formed of at least one layer based upon an organic ink, of a paint type, that is to say composed of an organic base, a diluent and organic and/or inorganic pigments. It may be black or colored, including being white. This layer is deposited on an internal face of a sheet constituting the laminated pane to protect it from external hazards. The term internal face of a sheet implies the face that is not in contact with the outside. This layer may be deposited, according to this invention, on the internal face of an external sheet or on any face of an intermediate sheet, that is to say a non-external sheet. It may also be deposited on the face towards the passenger compartment or the bodywork opening, or the fuselage of an aircraft.

For this reason, the layer or coating according to this invention is generally deposited before the assembling of the laminated pane.

This assembling consists, conventionally, of two steps: a preliminary assembling and a final assembling.

Various techniques are used for carrying out the preliminary assembling.

One of these techniques is that known as calendering. The various elements intended to be assembled together, superimposed one upon another in the desired arrangement, are heated and are subjected to a pressure applied by the rollers of the calenderer. The conjugate action of the heating and the pressure causes an adhesion between the different elements, thus preassembling them.

Another technique for preliminary assembling uses the conjugate action of vacuum and heat. The elements, superimposed in the desired arrangement, are introduced into a sealed bag, itself heated and subject to a vacuum.

The definitive or final assembling is generally carried out in an autoclave, where the preassembled laminated assembly is subjected to the simultaneous action of temperature and pressure.

Whatever the manner of assembling, it is carried out under the conjugate action of pressure and temperature, parameters that can reach values, during the definitive assembling, as high as 12 bars at 100° C. respectively.

This is one of the reasons why the inorganic coloring matters, such as enamel, are preferred to the other organic coloring matters of the paint type, since the inorganic materials resist such assembling conditions without risk of creep or flow, in particular.

Some tests have been carried out for the purpose of coloring a laminated pane by the use of an organic ink. Nevertheless, in all these cases, the processes have the objective of impregnating the sheet of plastics material with the coloring matter before the assembling operation. The coloring matter then penetrates into the thickness of the sheet of plastics material, before it is subjected to the pressure and temperature used during assembling. The risks of deterioration of the coloration then appear to be limited, in particular the risks of flow of the organic matter, the latter being, so to speak, fixed within the plastics material.

Surprisingly, the inventors have demonstrated that an organic ink and, notably, an ink of the epoxy type, deposited on a sheet and then subjected to the assembling operation, does not experience any visible damage, although it is not fixed in the sheet. It is, to some extent, juxtaposed on the face of a sheet of flexible plastics material. It may be considered that the ink does not penetrate into its support during the assembling, except at the interface formed by the sheet of flexible plastics material and by the layer based upon an organic ink. This layer constitutes a sort of coating.

This organic ink, of the paint type, is constituted notably of organic pigments, of a diluent and of an organic base of the epoxy type. This base should possess particular properties for the application envisaged. It should have, in particular, a sufficient bond to the sheet of plastics material supporting it so that, after a simple deposition onto this support and drying, preferably at ambient temperature, the motif will not deteriorate during the assembling of the pane. The diluent is, for example, an aqueous solution or an organic solvent capable of adjusting the viscosity of the ink for the purpose of the intended use.

In order to improve the adhesion of this ink to the flexible plastics material, it is advantageously placed between two sheets of flexible plastics material.

The motif is advantageously deposited by screen-printing.

This process consists of coating, with a coloring matter, at least a portion of a cloth comprising an assembly of pores, the contour of which constitutes the motif to be printed. By means of a scraper, the coloring matter is transferred from the cloth to the substrate of plastics material placed beneath said cloth, in order to produce the desired motif. The coloring matter has a sufficiently low viscosity to allow this transfer without, however, being too low, in order that smudges on the sheet of flexible plastics material may be avoided. The coloring matter is then dried, for example for half an hour at ambient temperature. The various sheets constituting the laminated pane, which may include several sheets provided with at least one film based upon an organic ink, are then assembled under the conjugate action of heat and pressure.

This process is particularly simple to carry out. Furthermore, it has the advantage that motifs can be produced with high accuracy in a reproducible manner.

The motifs according to this invention may be straight or curved strips, geometrical figures, drawings, numerical or alphabetical inscriptions etc. The motifs may extend to the edge of the pane. When the laminated pane is a pane for a transportation vehicle, in particular an automobile, this motif may advantageously comprise a strip forming a frame along at least a part of the periphery of the pane and a succession of lines, formed of dots, the size of which decreases towards the center of the pane. This grading enables a transition to be obtained between the layer of color and the transparent zone of the pane, thus improving both the comfort of the driver and the appearance of the pane.

Apart from the high accuracy of the motifs produced according to this invention, these motifs may be either of a single color or multicolored. The term color includes, according to this invention, white, black, grey or any other color. Variants or color effects may also be produced, by superposing different layers of color. Several layers of color can be superposed on a single sheet of plastics material, if desired on the same side. Several sheets of plastics material, on which at least one layer of color has been deposited, may also be superposed. Any variant may also be envisaged without departing from the spirit of the invention. Sheets without color layers may, for example, be interleaved between said sheets comprising at least one color layer.

The motif may be deposited on a sheet of polyurethane. It may also with advantage be deposited on a sheet of polyvinyl butyral. This material has the characteristic of possessing a rough surface. The presence of this miniroughness enables the air to escape when the laminated pane is being assembled.

Surprisingly, the form of the motif according to this invention can be as accurate as an inscription, the motif having been deposited on one of the two surfaces undergoing, furthermore, a surface transformation during the later assembling at the depot.

The invention also concerns the method of manufacturing such a pane. According to this method, a layer based upon an organic ink of the epoxy type is first deposited on one face of a sheet of flexible plastics material.

This sheet, provided with the costing based upon an organic ink, is then dried, preferably at ambient temperature, and then is assembled under the conjugate action of pressure and heat with at least one other sheet constituting the pane, in accordance with the desired arrangement.

According to a preferred variant, another sheet of flexible plastics material is placed over the coating based upon an organic ink, this assembly then being assembled with other sheets for the purpose of obtaining a laminated pane.

It is also possible to deposit, on several sheets of flexible plastics material, at least one layer based upon at organic ink, these sheets being subsequently assembled with at least one other sheet in order to constitute the laminated pane.

BRIEF DESCRIPTION OF THE DRAWINGS

Other advantages and characteristics of the invention will become apparent from the description given below with reference to the figures, in which:

FIG. 1 is a view of a motif according to this invention,

FIG. 2 is a view of another motif according to this invention,

FIG. 3 is a cross-section through a laminated pane according to this invention,

FIG. 4 is a cross-section through a laminated pane according to this invention, comprising several sheets of flexible plastics material possessing a motif.

BEST MODE FOR CARRYING OUT THE INVENTION

FIG. 1 represents a windscreen 1 for automobiles. The motif 2, deposited according to this invention, is visible. It comprises a mask-shaped strip 3 and a succession of lines, formed of dots 4, 5, 6, the size of which decreases towards the center of the pane. This strip, as illustrated in the figure, extends right to the edge of the pane. Only a portion of the dots is shown, for practical considerations. In the example illustrated, the dots constituting the line 4 are, for example, larger than those of the line 5, which themselves are larger than those of the line 6. The diameters of the dots may, for example, very from 3 mm to 1 mm, the difference in diameter between two successive lines being 0.5 mm. This motif demands high accuracy in the process of depositing the motif and also excellent thermal and mechanical stability of the ink of which the motif in formed. The latter has a function that is both decorative and functional, protecting the adhesive strips serving for fixing the pane in the opening of the vehicle bodywork from light and/or masking heating networks.

FIG. 2 illustrates another example of a motif that can be produced according to this invention. This motif comprises a curved strip 7 and an inscription 8. This motif may, for example, be used for a protective glass for the headlights of a vehicle, such as a train. This motif then has an essentially decorative function.

FIG. 3 shows a cross-section through a laminated windscreen according to this invention. This windscreen is composed of two rigid outer sheets 9, 10. These rigid sheets may be of polytmethacrylate, of glass, of chemically or thermally toughened glass or of any other transparent rigid material. Preferably, they will be two curved, chemically toughened sheets of glass. Two sheets of polyvinyl butyral 11 and 12 are incorporated between the rigid sheets 9 and 10. As an indication, the thickness of the rigid sheet is of the order of 4 mm; the thickness of a sheet of polyvinyl butyral is of the order of 2 mm.

The visible motif is constituted of a color layer 13, situated on the face 14 of the polyvinyl butyral sheet 11, that is to say at the surface of this face. It could also be situated on the face 15 of the polyvinyl butyral sheet 12. This color layer may be constituted of a discontinuous strip of colors, as illustrated, of a continuous strip, or of precise motifs. When the colors layer is incorporated between two sheets of flexible plastics material, as illustrated in the figure, its adhesion to its support is improved. It way also be deposited on the face 16 or 17 of the sheets 11 and 12, respectively.

FIG. 4 illustrated an example of a motif comprising colors effects according to this invention.

These effects are obtained, according to the figure, by a superposition of polyvinyl butyral sheets 18, 19, 20, upon each of which there is situated a colors layer 21, 22, 23 respectively.

In accordance with the drawing, the layer 21 is composed of a continuous strip of colors. The layer 22 is composed of patches of the same colors as the layer 21. The patches may have different shapes, disposed at uniform or nonuniform intervals on the sheet 19. A more opaque colors is thus produced at intervals. The layer 23 comprises, in the figure, motifs of a colors different from the layer 21 or the layer 22, for the purpose of obtaining moire effects or a two-colors motif. These motifs may be aligned with the motifs of the layer 22, as illustrated by the motifs 24, or may be offset, as illustrated by the motifs 25. Effects of colors may thus be obtained as well as a multicolors motif. If the layers 21 and 22 are, for example, yellow and the layer 23 is blue, the motif obtained according to FIG. 4 will be yellow and blue.

These figures illustrate the invention in a non-limiting context. Other variants may be obtained, without departing from the spirit of the invention. One layer may, for example, be of several colors.

The following examples illustrate the good behaviour and resistance of the pane according to this invention, to ultraviolet radiation, to heat, to humidity and also to thermal shocks. The good bond of the motif to a sheet of polyvinyl butyral is also demonstrated.

Example 1

Specimens are produced in the following way: two sheets of polyvinyl butyral are placed between two glass sheets of 4 mm thickness. One of the sheets comprises a motif according to this invention, in which a way that this motif is incorporated between the two sheets of polyvinyl butyral, the stack is then assembled under the conjugate action of pressure and heat. The motif is formed of a black, grey or white strip and of an inscription of the same color as the strip. The ink used in an epoxy resin resulting from the condensation of bisphenol A and epichlorhydrine. It is deposited by screen-printing.

Certain specimens comprising the three colors of ink are placed in a climatically controlled enclosure with 95% relative humidity and a temperature of 54° C.

After a period of 30 days, no modification is visible for any of the black, grey or white inks.

Other specimens are placed in a climatically controlled enclosure programmed in accordance with the following cycle: the initial temperature is −40° C. The temperature rises to 80° C. in 2 hours and is held at this temperature for 4 hours. The temperature is then reduced to −40° C. in 2 hours and is held at this value for 4 hours.

After 100 cycles, no degradation of the specimens can be seen for any of the inks black, grey or white.

Specimens composed of the two sheets of polyvinyl butyral, between which is placed an ink based layer constituting the motif, are placed in an autoclave, in which the temperature reaches 125° C. under a pressure of approximately 12 bars. After a period of approximately 2 hours, no degradation of the black, grey or white inks is visible.

This example illustrates the good thermal resistance of the ink used.

Example 2

Specimens identical to those described in Example 1 are prepared. The ink is of black or grey color.

Obviously, numerous modifications and variations of the present invention are possible in light of the above teachings. It is therefore to be understood that within the scope of the appended claims, the invention may be practiced otherwise than as specifically described herein.

The specimens are subjected to the ultraviolet radiation resistance test described in standard ASTM-G-5377. They undergo 16 hours exposure to ultraviolet radiation at 55° C. followed by 8 hours condensation at 45° C., the relative humidity being 100%.

After 60 cycles, no degradation can be seen.

This example illustrates the improved resistance to ultraviolet radiation of the pane according to this invention.

Example 3

Specimen 1 of glass 8×8 cm are coated with a sheet of polyvinyl butyral, on which a black, grey or white ink has been deposited by screen-printing according to this invention. This ink is identical to that described in Example 1. It is situated at the interface between the glass sheet and the polyvinyl butyral sheet. A tongue 1 cm wide is cut out from the polyvinyl butyral sheet and it is pulled off for a length of 3 cm.

Specimens 2 of glass 8×8 cm are coated with two sheets of polyvinyl butyral, between which there is incorporated, by screen-printing, a black, grey or white ink according to this invention. This ink is identical to that described in Example 1.

A tongue 1 cm in width is cut out from the polyvinyl butyral sheet which has one face exposed, that is to say not supported by the glass sheet, and this is pulled off for a length of 3 cm.

The test consists of pulling the tongue, perpendicularly to the surface of the glass. The force necessary for peeling off is measured.

The force necessary for peeling off Specimen 1 in 10 Newtons; while the force necessary for peeling off Specimen 2 is 20 Newtons.

This example illustrates the improved adhesion of the motif deposited between two sheets of flexible plastics material.

We claim:

1. Laminated pane, which comprises:
   at least one visible motif, said pane comprising at least one rigid sheet of one of a glass material and a plastics material and of at least one sheet of flexible plastics material, wherein the motif is at least partly formed of at least one coating of organic ink epoxy layer, said layer lying exclusively on a substantially planar exterior surface portion of at least one of the sheets of flexible plastics material of the laminated pane, said coating comprising a nonpenetrating coating dried at an ambient temperature so as to prevent deterioration of said motif.

2. Pane according to claim 1, wherein the organic ink layer is one of a black layer and a colored layer.

3. Pane according to claim 2, wherein the ink comprises pigments, a diluent and an organic epoxy base.

4. Pane according to claim 1, wherein the sheet of flexible plastics material comprises polyurethane.

5. Pane according to claim 1, wherein the sheet of flexible plastics material comprises polyvinyl butyral.

6. Pane according to claim 1, wherein the sheet of flexible plastics material is coated with at least one organic ink layer.

7. Pane according to claim 1 wherein the motif comprises a strip forming a frame over at least a portion of the periphery of the pane.

8. Pane according to claim 7, wherein the motif comprises a plurality of lines formed of dots, the size of said dots decreasing towards the center of the pane.

9. Pane according to claim 1, wherein the motif comprises an inscription.

10. Pane according to claim 1 wherein the at least one pane comprises a plurality of curved, chemically toughened rigid sheets.

11. A laminated pane as claimed in claim 1, wherein said motif has a roughened surface so as to permit escape of air upon assembly of the laminated pane.

12. Method of producing a laminated pane having a visible motif, which comprises:
    depositing at least one organic ink epoxy layer on a substantially planar exterior surface portion of at least one sheet of flexible plastics material so as to form a nonpenetrating coating on said face portion and form at least part of said motif such that said coating lies exclusively on said exterior surface portion,
    drying said layer at ambient temperature so as to prevent deterioration of the motif, and
    assembling said sheet under conjugate action of pressure and heat with at least one additional sheet constituting the laminated pane.

13. Method according to claim 12, which comprises assembling other sheets onto said at least one sheet and forming a laminated pane.

14. Method according to claim 13, wherein said at least one sheet comprises a plurality of sheets having at least one additional organic ink layer deposited thereon.

15. The method as claimed in claim 12, which comprises depositing said layer on said exterior surface, said layer being formed with rough surface so as to permit escape of air upon assembly of the laminated pane.

16. A laminated pane made by the process according to claim 12.

* * * * *